United States Patent [19]

Berry

[11] 3,835,571

[45] Sept. 17, 1974

[54] POWER FISHING REEL

[76] Inventor: Arthur E. Berry, 18645 Cambridge Dr., Lathrup Village, Mich. 48076

[22] Filed: Dec. 11, 1972

[21] Appl. No.: 313,864

[52] U.S. Cl............... 43/21, 43/43.12, 242/84.1 A, 242/84.1 M, 242/84.5 R, 242/99, 242/106
[51] Int. Cl.. A01k 87/04, A01k 89/02, B65h 75/30
[58] Field of Search........... 242/106, 99, 85, 86.5 R, 242/86.5 A, 86.7, 87.8, 65, 54, 156, 84.1 A, 84.5 R, 84.52 R, 47, 75.3, 75.4, 75.43, 75.44; 43/6.5, 20, 21, 21.2, 26.1, 26.2, 27.2, 27.4, 24, 43.12

[56] References Cited
UNITED STATES PATENTS

| | | | |
|---|---|---|---|
| 594,411 | 11/1897 | Martin | 242/84.1 M |
| 2,147,351 | 2/1939 | Ram | 242/156 |
| 2,623,704 | 12/1952 | Bergman et al | 242/84.4 |
| 2,753,125 | 7/1956 | Wurmli | 242/65 |
| 3,100,606 | 8/1963 | Nicholson | 242/86.5 A |
| 3,719,331 | 3/1973 | Harsch | 242/106 |

*Primary Examiner*—John W. Huckert
*Assistant Examiner*—John M. Jillions
*Attorney, Agent, or Firm*—William T. Sevald

[57] ABSTRACT

A power fishing reel having a reversible drive for raising and lowering metal line and a heavy sinker in deep-water trolling. A fishing line, bait, and hooks are releasably attached adjacent the sinker and are thus put down to the desired depth and separate from the sinker line upon a fish taking the bait. Drive is controlled by a switch so that when a fish is caught, the fisherman throws the switch and the sinker line and sinker are pulled up by the power reel, preventing fouling of the lines by the action of the fish. The reel is provided with drive disengagement means to lower the sinker quickly by gravity, brakes to control the outrun to prevent back-lash, level-wind means, a displaceable sheave to insert the line radially, and a two position roller for leading the sinker line to the center of the sheave on either side of a boat with the roller absorbing angular changes at the sheave from pitching and rocking of the boat.

8 Claims, 9 Drawing Figures

3,835,571

POWER FISHING REEL

BACKGROUND OF THE INVENTION

In deep-water trolling for lake trout, coho salmon, and other fish it is necessary to use a first metal sinker line and a heavy sinker of about 8 pounds to sink the line to the desired depth of 100 to 300 feet. In the prior art the sinker line is lowered and raised manually on a hand reel or coiled around a separator. A second non-metal fish line and reel are used and the bait and hooks are attached to the fish line. The fish line is attached to the sinker line adjacent the sinker by a spring clevis which grips strong enough to sink the fish line and trail the bait and hooks on a length of the fish line but which does not grip strong enough to withstand the pull of fish on the hooks. The fisherman thus pays both the sinker line and the fish line at the same time to lower the sinker, the bait, and the hooks to the desired depth. He then secures the sinker line, trolls the bait and hooks, and watches the angle of the fish line. Upon the angle of the fish line changing, the indication is that a fish has pulled the fish line free of the sinker line. At this point, it is necessary to immediately raise the sinker line to prevent the fish circling and fouling the lines. At this point, it is also necessary to man the fish pole and reel to set the hooks and play the fish. The fisherman finds that he is handicapped in manning either line by the presence of the other and that he cannot do both jobs properly at the same time with a heavy metal sinker line and sinker on one reel or separator and a heavy fish on the other fish line and reel.

SUMMARY OF THE INVENTION

The primary purpose of the invention is to eliminate the handling factor relative to the metal sinker line, heavy sinker, and reel upon the fish taking the bait and separating the fish line at its releasable spring clip attachment to the sinker line so that the only job the fisherman will have upon a fish striking is to man the fish rod, line, and reel.

An object of the invention is to provide a power operated reel for the sinker line and sinker so that the fisherman can raise the sinker line and sinker clear of the fish line and fish by merely throwing a switch.

An object of the invention is to provide a reversible motor on the sinker line reel so that the sinker line and sinker can be lowered with the motor running in one direction and raised with the motor running in the other direction.

An object of the invention is to provide an easily disengageable drive between the motor and the reel so that the user may optionally let sinker line run free off the reel to quickly lower the sinker.

An object of the invention is to provide brake blocks adjacent the reel so that the fisherman can control free running of the reel to prevent back-lash, etc.

An object of the invention is to provide a pole and a sheave at the end of the pole for leading the metal line from and to the reel.

An object of the invention is to provide means sidewise pivotally mounting the reel, with its pivotal movement limited by stops, so that it can change its angle relative to the line reeled in to effect level winding on the reel.

An object of the invention is to provide a roller on the pole adjacent the sheave to lead the metal line directly to the center of the sheave and to absorb the otherwise changing angle of the sinker line to the sheave as the boat rocks and pitches.

An object of the invention is to provide a socket closely surrounding the sheave and an open side on the socket so that the sheave can be moved axially out of the socket to thread the sinker line radially on the sheave and a spring displacably holding the sheave in the socket.

These and other objects of the invention will become apparent by reference to the following description of the illustrated embodiment of the power fishing reel embodying the invention taken in connection with the accompanying drawings.

DESCRIPTION OF THE PREFERRED EMBODIMENT

Figure 1:
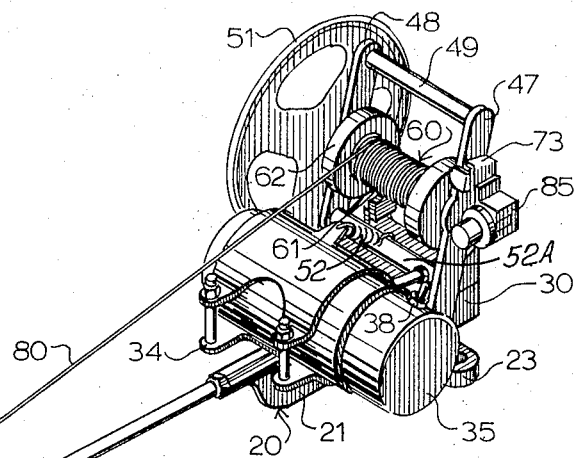
FIG. 1 is a perspective view of the power fishing reel with metal line wound thereon leading to a sinker together with a portion of fishing line, hooks, and bait releasably clipped to the sinker line, showing the driven wheel on one side and the counter on the other side of the spool portion.
Figure 2:
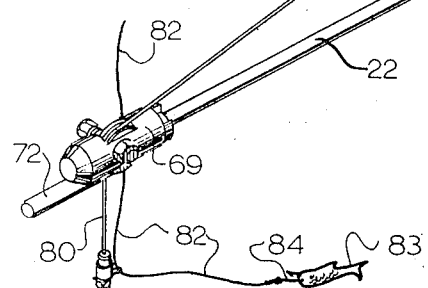
FIG. 2 is shortened side elevational view of the near side of the reel as seen in FIG. 1.
Figure 2:
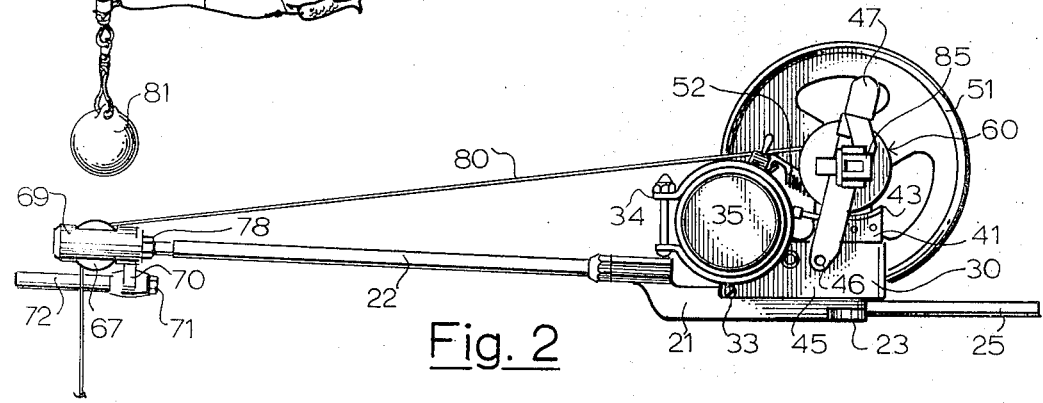
Figure 3:
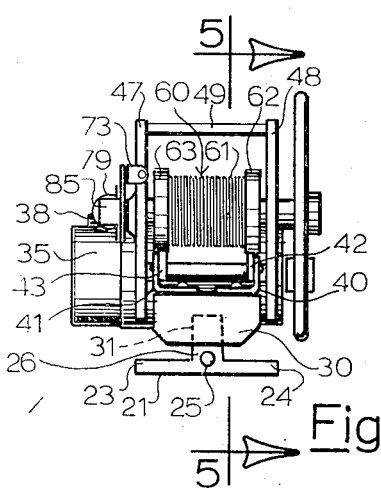
FIG. 3 is a rear elevational view of the reel as seen in FIG. 2.
Figure 4:
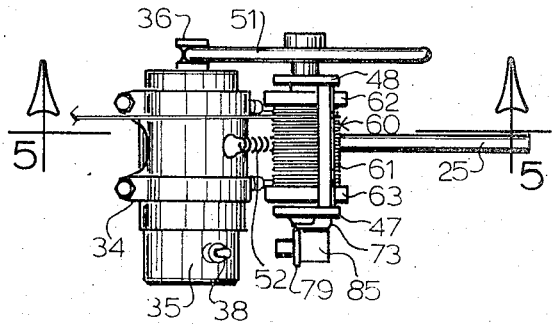
FIG. 4 is a top plan view of the reel as seen in FIG. 2 with the pole removed and sinker line broken away.
Figure 5:
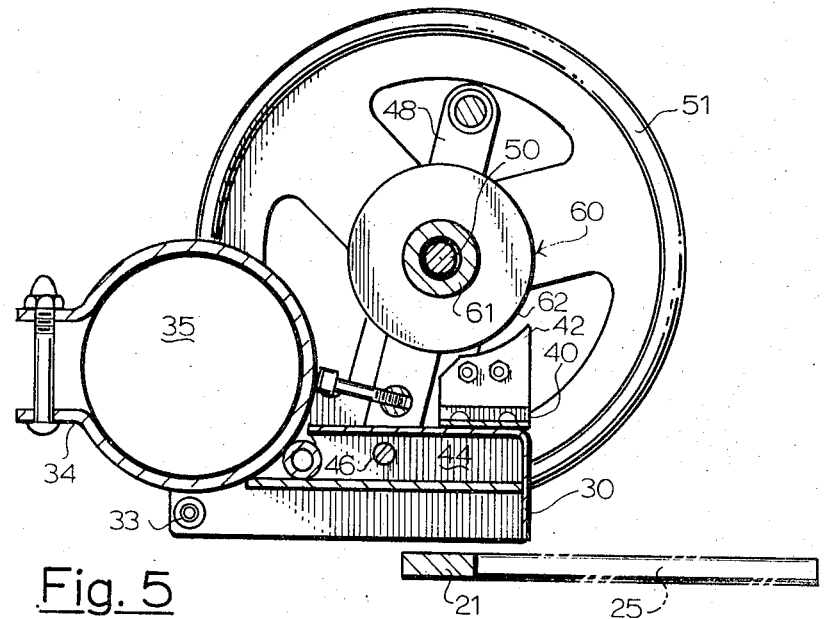
FIG. 5 is an enlarged vertical longitudinal cross-sectional view of the reel as seen in FIGS. 3 and 4, taken on the line 5—5 thereof, with the motor removed from the motor mount.
Figure 6:
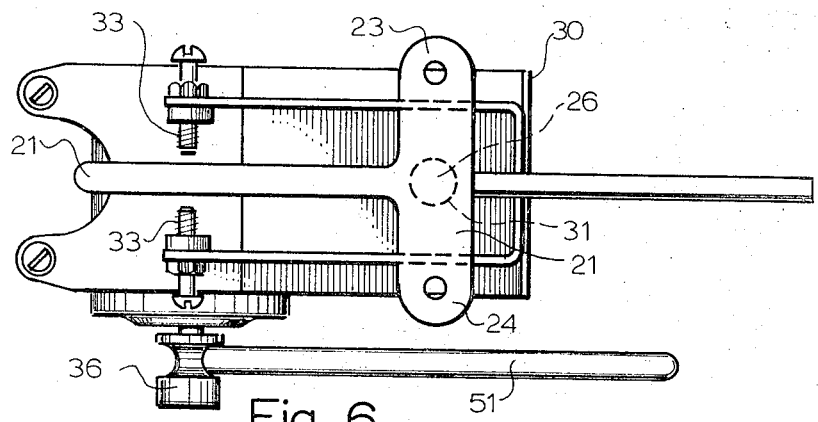
FIG. 6 is a bottom plan view of the reel as seen in FIG. 5, with the spool portion removed showing the stops limiting sidewise pivoting of the spool.
Figure 7:
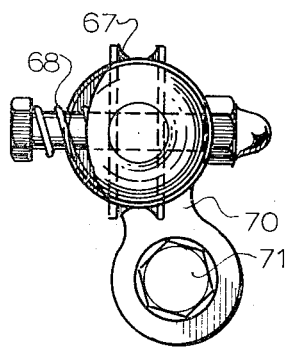
FIG. 7 is an enlarged front elevational view of the sheave and socketed head on the end of the pole as seen from the left end of FIG. 2, showing one side of the lead roller aligned with the center of the sheave.
Figure 8:
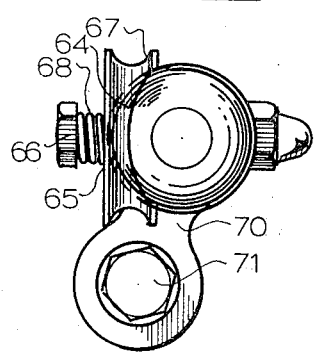
FIG. 8 is a view similar to FIG. 7 showing the other side of the lead roller aligned with the sheave.
Figure 9:
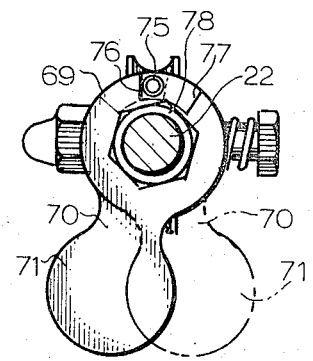
FIG. 9 is a rear view of the head and sheave as seen in FIG. 7, showing the lug and abutments for positioning the neck and roller with one side of the roller aligned with the sheave and showing the other aligned position in dotted lines.

Referring now to the drawings wherein like reference numerals refer to like and corresponding parts throughout the several views, the power fishing reel 20 disclosed therein to illustrate the invention comprises a base 21, a pole 22 extending from the base 21, and brackets 23 and 24 to mount the reel 20 on a boat and/or a rod 25 for insertion in a socket on a boat. The base 21 has a post 26 in its central area.

A platform 30 has a socket 31 receiving the post 26 to pivotally mount the platform 30 on the base 21. Paired stops 33 on the platform 30 are adapted to engage the base 21 to limit pivotal movement of the platform 30 relative to the base. The stops 33 may be adjustable as shown or fixed if desired. A motor mount 34 is at the pole 22 end of the platform 30. A motor 35 is fixed in the mount 34 and a small friction drive wheel 36 is fixed on the motor shaft 37. A switch 38 on the motor 35 controls D.C. power. The switch 38 has neutral, reel out, and reel in positions coordinating with current polarity, the windings of the motor, and the position of the motor. Paired spaced flanges 40 and 41 extend above the platform 30 spaced from the motor 35. Brake blocks 42 and 43 are mounted on the flanges 40 and 41 respectively. Paired spaced legs 44 and 45, equipped with bearing apertures, extend above the platform 30 and lie intermediate the motor 35 and the flanges 40 and 41. A pin 46 lies in the apertures of the legs 44 and 45. Paired spaced arms 47 and 48 are pivoted on the pin 46 at their lower ends and have upwardly extending top ends and a central portion equipped with bearing apertures. A cross-bar 49 interconnects the top ends of the arms 47 and 48. An axle 50 lies in the bearing apertures of the arms 47 and 48 and has opposite ends extending outwardly of the arms 47 and 48. A large friction driven wheel 51 is fixed on one extending end of the axle 50 at the small drive wheel 36 of the motor 35. A cross bar 52A lies between the arms 47 and 48 above the pivot point 46 of arms 47 and 48. A spring 52 has one end engaging the cross bar 52A and another end anchored on the motor 35, motor mount 34, or other fixed anchor. The resilient tension of the spring 52 on the cross bar 52A pulls the cross bar 52A toward the motor 35 and this pull is transferred by the cross bar 52 to the arms 47 and 48 urging said arms to swing on the pivot 46 toward the motor 35. Since the driving wheel 36 is fixedly mounted on the motor 35 and since the driven wheel 51 is mounted on the axle 50 which is swingably mounted on the arms 47 and 48, the pull of the spring 52 thus urges the driven wheel 51 into engagement with the driving wheel 36 to effect drive therebetween to rotate the axle 50. The user may disengage drive by moving the cross bar 49 at the outer ends of the arms 47 and 48 away from the motor 35 thereby swinging the arms 47 and 48 at the pivot 46 against the tension of the spring 52. This moves the driven wheel 51 on the arms 47 and 48 away from the drive wheel 36 on the motor 35. The manual disengagement permits the user to let line run off free of drive connection to quickly lower a weight, set out a bait, give more line to a fish, or given more line to a snag. While friction wheels are shown, toothed wheels may be used if desired.

A spool 60 is fixed on the axle 50 intermediate the arms 47 and 48 and has a central line portion 61 and paired side discs 62 and 63 for containing the line on the central portion 61. The discs 62 and 63 also are aligned to engage the brake blocks 42 and 43 respectively for controlling free-running of the axle 50 and spool 60.

A case 69 defines an open-sided socket 64 and is mounted on the outer end of the pole 22. A pin 65 extends from the socket 64 and is equipped with a head 66 at its outer end. A sheave 67 is pivoted on the pin and normally lies in the socket 64. A spring 68 lies between the head 66 and the sheave 67 resiliently urging the sheave 67 to its normal position in the socket 64. The sheave 67 is axially moveable out of the socket 64 by hand against the spring 68 so that the fisherman may thread the line radially on the sheave 67.

A neck 70 extends radially from the case 69 and a stub-shaft 71 extends from the neck 70 and lies parallel to the pole 22 and is spaced from the case 69. A roller 72 is pivotally mounted on the stub-shaft 71. The neck 70 extends at an angle to the sheave 67 to locate the periphery of one sector of the roller 72 in alignment with the sheave 67 and with the opposite sector outboard of the sheave 67.

The neck 70 is adjustable between two angular positions to swing the roller 72 to the other side of the sheave 67. A lug 75 on the neck 70 lies between spaced abutments 76 and 77 on the case 69. The case 69 is threaded on the pole 22 and a lock nut 78 secures its angular position. The neck 70 is jammed between the lock nut 78 and the case 69. By loosening the lock nut 78, the neck 70 may be swung from one position to the other as limited by the lug 75 engaging one or the other of the abutments 76 and 77.

A digital counter 85 is mounted on one arm 47 or 48 opposite the driven wheel 51 at the end of the axle 50. A pully 79 on the counter 85 rides against the axle 50 at its end extending beyond the arms 44 and 45 so that rotation of the axle 50 operates the counter 85 by turning the pully wheel 79. The pully wheel preferably engages the end of the axle 50 at a point radially of its axis so as to impart rotational drive to the counter 85 coordinated with the length of the line in one turn about the spool 60. The pulley wheel 79 may also engage the axle 50 radially with the diameter of the axle at the point of engagement lessened or increased to properly drive the counter per length of line unwound per revolution of the spool 50. As shown, the counter 85 is hingedly mounted at 73 to gravitationally press the pulley wheel against the axle 50. The counter 85 may be mounted as desired and may be spring-pressed into engagement with the axle.

OPERATION OF THE DEVICE

The power fishing reel 20 is fixed on the boat so that the fisherman does not have to hold it and this leaves him free to man the fishing pole. A metal line 80 is wound on the spool 60 and rides through the sheave 67 and over the roller 72. The sinker 81 is fixed on the metal line 80 and the fishing line 82 is releasably spring-clipped to the metal line 80 with its bait 83 and hooks 84 on a trailing length of fishing line 82. The fisherman prepares the fishing line 82 for paying out, puts the sinker 81 over the side, and throws the switch 38 to the "reel-out" position for power reeling-out. If the fisherman so elects, he may not use power reeling-out, but may grasp the cross-bar 49, disengage the drive wheel 36 and driven wheel 51, and allow the spool 60 to run free and control the free out-running of the metal line by pulling the crossbar farther against the spring 52 to engage the discs 62 and 63 against the brake blocks 42 and 43. Upon the weight reaching the desired depth, the fisherman shuts off power or releases the cross-bar 49 and the drive wheels 36 and 51 hold the spool 60 stationary. In the unreeling of the metal line, the axle 50 drives the counter 85 and the fisherman scans the counter reading. Upon the counter 85 registering the desired depth or the desired length of the metal line extended, he stops the unreeling. In this regard, the counter 85 and axle 50 drive may be so coordinated to indicate depth directly by a calculated compensation for the bend in metal line to achieve the desired depth when trolling. The counter 85 may indicate the length of line extended in measurement units such as feet and the fisherman may calculate the bend in the line and the added length needed to achieve a desired depth.

Upon a fish striking the bait and detaching the fish line from the sinker line, the fisherman throws the switch 38 to the reel-in position and mans the fishing pole whereupon the power reel 20 automatically raises the metal line 82 and the sinker 81 preventing fouling of the lines by the action of the fish.

The scope of the invention is defined in the appended claims.

I claim:

1. A power fishing reel, particularly suitable for quickly lowering and raising metal line and a heavy sinker weight for deep water trolling, comprising:
   a housing having a platform, paired spaced legs, and a motor mount,
   a motor secured on said motor mount,
   a relatively small drive wheel on said motor,
   a line guide connected to said platform
   a spool assembly adjacent said motor; said line guide and said spool assembly lying in opposite radial directions of said drive wheel; said spool assembly including,
   paired spaced arms having first and second ends and a central portion;
   said arms being pivotally connected to said legs at said first ends of said arms,
   a cross-bar fixed between said arms at their said second ends;
   said arms having aligned bearing apertures in their said central portions;
   an axle lying in said bearing apertures of said arms,
   a spool fixed on said axle between said arms;
   said axle having opposite ends lying outwardly of said arms,
   a relatively large driven wheel fixed on one said outward end of said axle in alignment with said drive wheel;
   said spool assembly thereby being swingable toward and away from said motor and said drive wheel; tension on a line leading past said motor to said spool urging said arms to swing toward said motor to urge said driven wheel on said spool assembly into driving engagement with said drive wheel on said motor, and
   a spring resiliently urging said spool assembly toward said motor to drivingly engage said driving wheel and said driven wheel to transfer drive from said motor to said spool;
   said cross-bar constituting a hand-grip for swinging said spool assembly against said spring and against tension on a line to said spool away from said motor to disengage said wheels to allow said spool to run free in extending line in lowering a weight.

2. In a reel as set forth in claim 1, said spool having annular side discs for containing line on said spool; and paired brake blocks mounted on said paired flanges of said housing in alignment with said discs of said spool;
   said spool assembly being swingable by said cross-bar hand grip against said spring beyond the point of disengagement of said wheels to engage said spool discs with said brake blocks to control the rotational speed and position of said spool when in free running condition.

3. In a reel as set forth in claim 1, a base below said platform of said housing,
   a post on one said platform and said base,
   a socket on the other platform and said base,
   said socket pivotally receiving said post to pivotally mount said platform on said base,
   stops on one said housing and said base contacting said other part limiting pivotal movement on said housing relative to said base;
   the limited pivotal movement of said housing relative to said base allowing said spool under line engagement position on said spool to change its angle of engagement relative to a line in reeling in line to level-wind the line on said spool.

4. In a reel as set forth in claim 1, a base below said platform of said housing, and a bracket extending from said base for mounting said reel on a boat.

5. In a reel as set forth in claim 1, a base below said platform of said housing, and a rod extending from said base for mounting said reel in a socket on a boat.

6. In a reel as set forth in claim 1, a base below said platform of said housing, and wherein said line guide includes a pole extending from said base terminating in an outer end having a socket;
   a sheave in said socket at the outer end of said pole for conducting line to and from said spool;
   said socket having an open side and a closed side,
   a pin in said socket rotatably supporting said sheave;
   said pin having a head spaced from said sheave; and
   a spring between said head and said sheave;
   said sheave being movable out of said socket to put a line on said sheave in a direction radially of the line;
   said spring normally holding said sheave in said socket to prevent radial movement of a line out of said socket and off said sheave.

7. In a reel as set forth in claim 6, a neck extending radially at an aft angle from said pole outer end, and
   a stub shaft on said neck lying parallel to said pole at said sheave, and a roller on said stub shaft;
   said stub shaft and said roller engaging trailing line and allowing trailing line to partially wrap and unwrap relative to said roller dependent on the changing angles therebetween such as in boat angle changes to the trailing line due to rolling and pitching;
   said stub shaft and said roller being angularly aligned aft of a boat relative to said sheave to lead line to said sheave in direct alignment to said sheave.

8. In a device as set forth in claim 7, said neck being adjustably mounted on said pole for changing the aft angle of its projection from said pole outer end from one side to the other side of center relative to said sheave dependent on the positioning of said reel on the port or starboard side of a boat.

* * * * *